(12) United States Patent
Prins et al.

(10) Patent No.: US 11,082,662 B2
(45) Date of Patent: Aug. 3, 2021

(54) ENHANCED AUDIOVISUAL MULTIUSER COMMUNICATION

(71) Applicants: Koninklijke KPN N.V., Rotterdam (NL); Nederlandse Organisatie Voor Toegepast-Natuurwetenschappelijk Onderzoek TNO, s-Gravenhage (NL)

(72) Inventors: Martin Prins, The Hague (NL); Hans Maarten Stokking, Wateringen (NL); Simon Norbert Bernhard Gunkel, Duivendrecht (NL); Hendrikus Nathaniël Hindriks, The Hague (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, 's-Gravenhage (NL)

( * ) Notice: Subject to any disclaimer, the term of this patent is extended or adjusted under 35 U.S.C. 154(b) by 0 days.

(21) Appl. No.: 16/955,019

(22) PCT Filed: Dec. 19, 2018

(86) PCT No.: PCT/EP2018/085759
§ 371 (c)(1),
(2) Date: Jun. 17, 2020

(87) PCT Pub. No.: WO2019/121864
PCT Pub. Date: Jun. 27, 2019

(65) Prior Publication Data
US 2020/0382747 A1     Dec. 3, 2020

(30) Foreign Application Priority Data

Dec. 19, 2017    (EP) ..................................... 17208498

(51) Int. Cl.
*H04N 7/15* (2006.01)
*H04S 7/00* (2006.01)

(52) U.S. Cl.
CPC ............. *H04N 7/157* (2013.01); *H04S 7/303* (2013.01); *H04S 2400/13* (2013.01); *H04S 2420/11* (2013.01)

(58) Field of Classification Search
CPC ................................... H04N 7/15; H04S 7/00
(Continued)

(56) References Cited

U.S. PATENT DOCUMENTS

2006/0290699 A1   12/2006   Dimtrva et al.
2012/0330659 A1   12/2012   Nakadai
(Continued)

FOREIGN PATENT DOCUMENTS

EP    2346028 A1    7/2011
EP    3255904 A1 * 12/2017  ............... H04S 7/30
(Continued)

OTHER PUBLICATIONS

International Search Report and Written Opinion for Int'l Application No. PCT/EP2018/085759, titled: Enhanced Audiovisual Multiuser Communication, dated Mar. 1, 2019.
(Continued)

*Primary Examiner* — Melur Ramakrishnaiah
(74) *Attorney, Agent, or Firm* — Hamilton, Brook, Smith & Reynolds, P.C.

(57) ABSTRACT

Systems and methods are provided for generating and rendering an enhanced audiovisual recording of a user, which may be used for multiuser communication, e.g., in Virtual Reality. Such an enhanced recording may be generated by determining a face orientation of the user in the audiovisual recording, and generating orientation data specifying an orientation which represents said determined face orienta-
(Continued)

tion. During rendering, the audio data may be rendered based on the orientation data, namely by rendering the audio data as a spatial audio source having a spatial direction which is congruent with the face orientation of the user in a visual representation of the user. Accordingly, the spatial direction of the voice of the user may better match the user's face direction in the user's visual representation.

12 Claims, 11 Drawing Sheets

(58) Field of Classification Search
USPC .......................................... 348/14.01–14.16
See application file for complete search history.

(56) References Cited

U.S. PATENT DOCUMENTS

| | | | |
|---|---|---|---|
| 2016/0234475 A1* | 8/2016 | Courchesne | ....... G06K 9/00315 |
| 2018/0091923 A1* | 3/2018 | Satongar | ................. G06F 3/012 |

FOREIGN PATENT DOCUMENTS

| | | | | |
|---|---|---|---|---|
| EP | 3255904 A1 | 12/2017 | | |
| WO | WO 2015/039239 A1 | 3/2015 | | |
| WO | WO-2015039239 A1 * | 3/2015 | ........... | G06T 19/006 |
| WO | WO 2019/121864 A1 | 6/2019 | | |

OTHER PUBLICATIONS

European Search Report for European Application No. EP 17208498. 0, titled: Enhanced Audiovisual Multiuser Communication; dated May 23, 2018.

ISO/IEC 23008-3 2015/Amd 3:2017, MPEG-H 3D Audio Phase 2.
Hirose, et al., "Integrating Live Video for Immersive Environments," IEEE (1999).
ETSI TS 103 223 V1.1.1 (Apr. 2015), MDA; Object-Based Audio Immersive Sound Metadata and Bitstream.
Annex to the European Search Report for European Application No. EP 17208498.0, titled: Enhanced Audiovisual Multiuser Communication; dated May 14, 2018.
Kato, et al., "On the Human Ability to Auditorily Perceive Human Speaker's Facing Angle," National Institute of Information and Communications Technology, 2010.
Edlund, et al., "On the effect of the acoustic environment on the accuracy of perception of speaker orientation from auditory cues alone," Proceedings Interspeech 2012 Portland, USA.
Bajd, et al, "Introduction to Robotics,", Chapter 2, "Rotation and Orientation," VII, 83 p., 42 illus. (2013).
Cohen, et al., "Speech Processing in Modern Communication," Springer (2010).
Ortolani, et al., "A New Approach to Acoustic Beamforming fromVirtual Microphones Based on Ambisonics for Adaptive Noise Cancelling," 2016 IEEE 36th International Conference on Electronics and Nanotechnology (ELNANO).
Füg, Simone, et al. "Design, coding and processing of metadata for object-based interactive audio." Audio Engineering Society Convention 137. Audio Engineering Society, 2014.
Discover Resonance Audio, https://developers.google.com/vr/concepts/ spatial-audio [retrieved on Jun. 17, 2020].
Rafaely, Boaz, et al., "Spherical Microphone Array Beamforming," Speech Processing in Modern Communication, Springer Berlin Heidelberg, pp. 281-305 (2010).

* cited by examiner

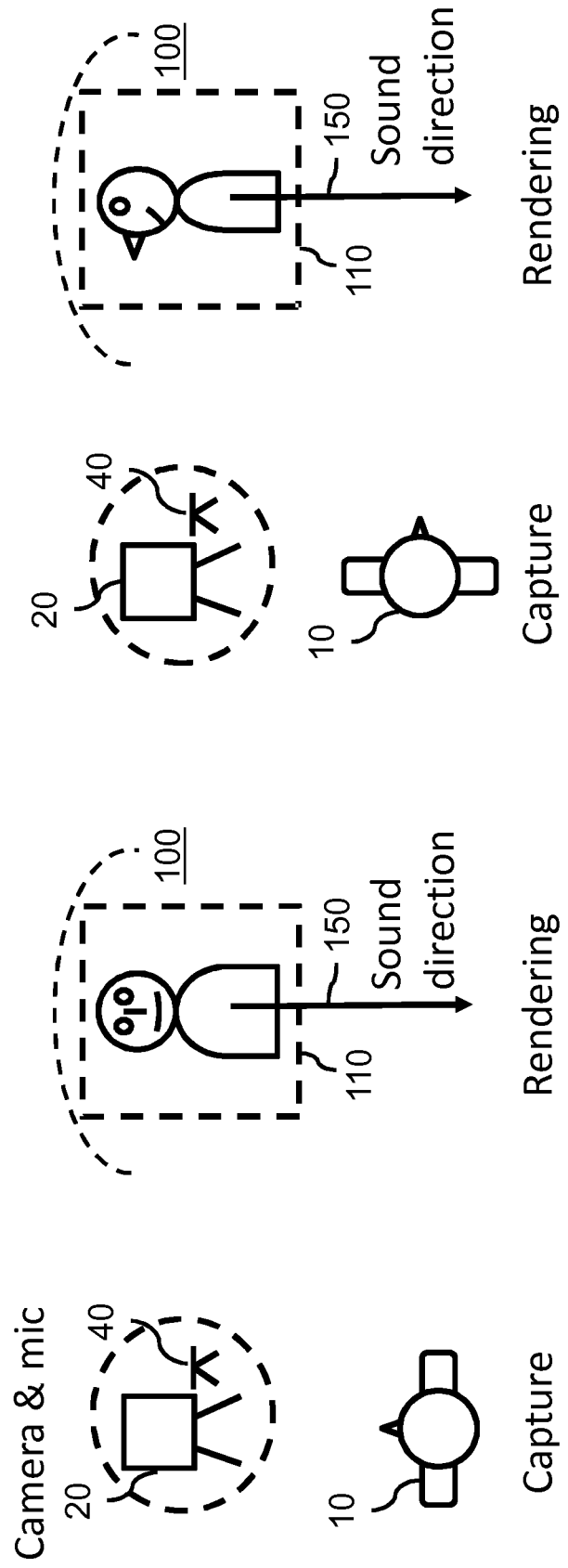

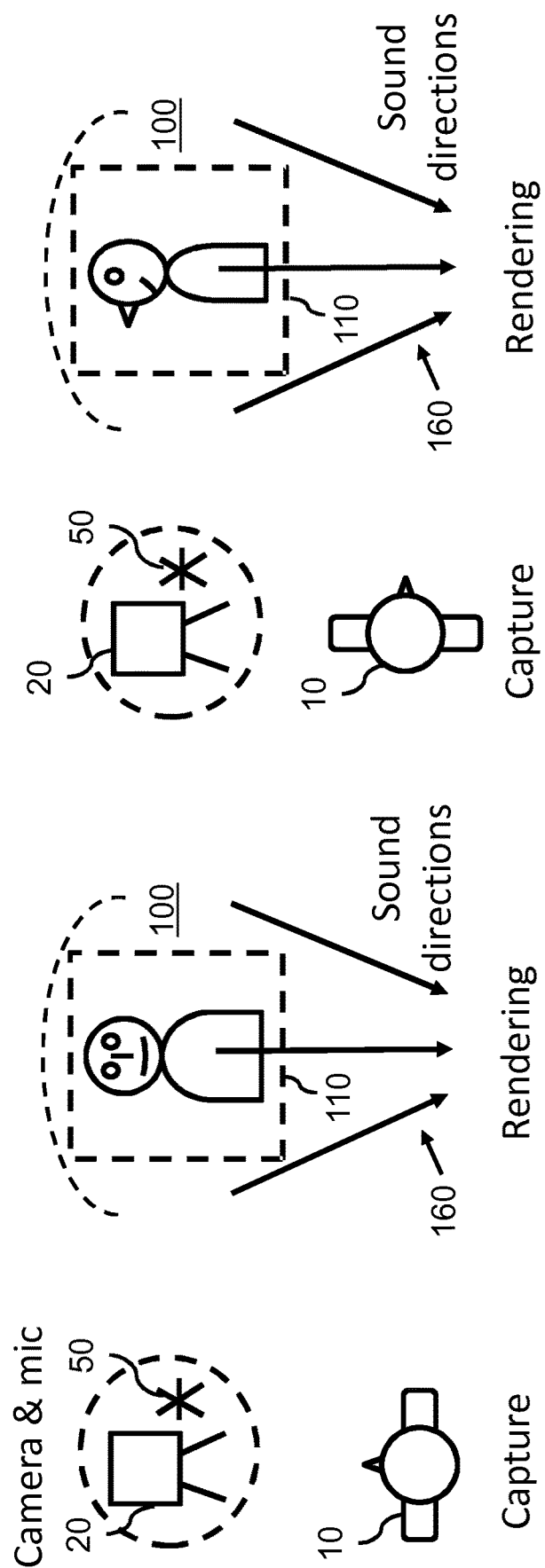

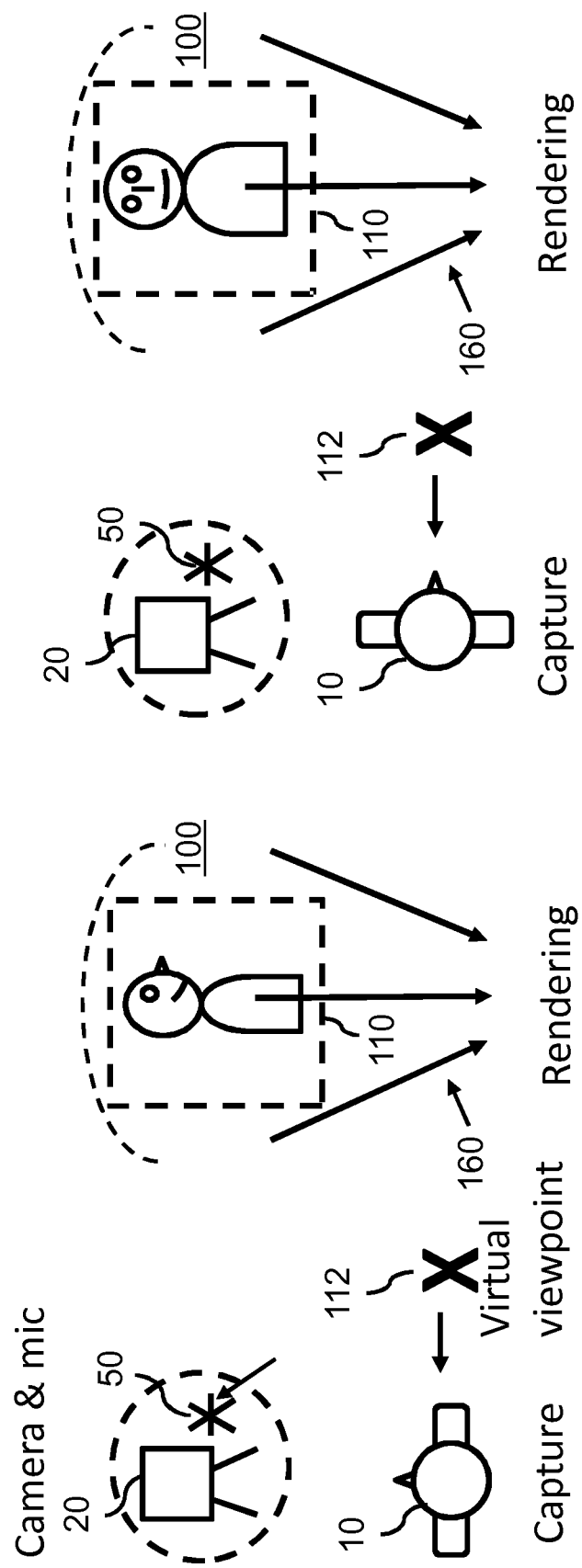

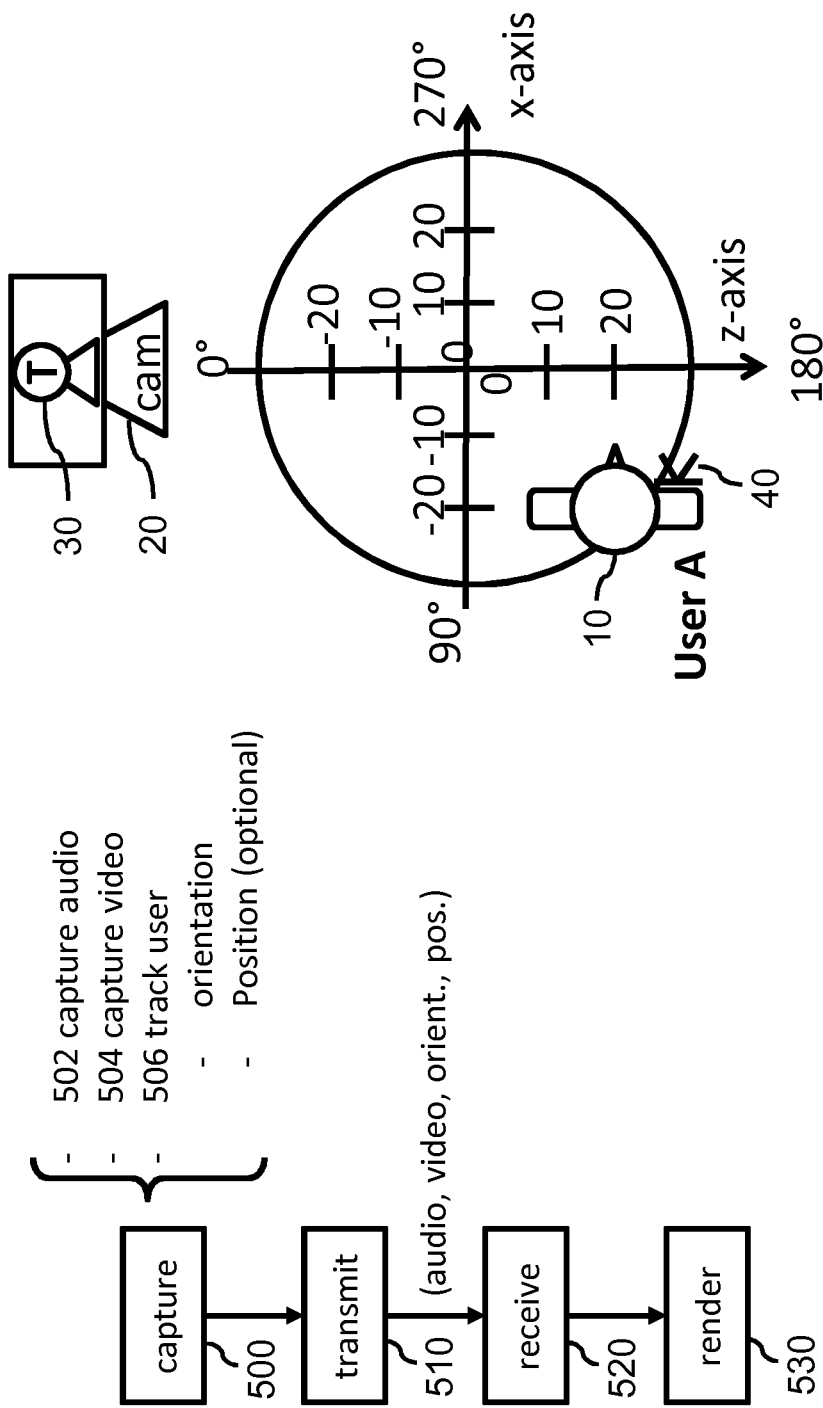

ENHANCED AUDIOVISUAL MULTIUSER COMMUNICATION

This application is the U.S. National Stage of International Application No. PCT/EP2018/085759, filed on Dec. 19, 2018, which designates the U.S., published in English, and claims priority under 35 U.S.C. § 119 or 365(c) to European Application No. 17208498.0, filed on Dec. 19, 2017. The entire teachings of the above applications are incorporated herein by reference.

FIELD OF THE INVENTION

The invention relates to a method of, and processor system configured for, rendering an audiovisual recording of a user. The invention further relates to a method of, and processor system configured for, generating an enhanced audiovisual recording of a user. The invention further relates to a computer program comprising instructions for causing a processor system to perform either method. The invention further relates to a computer-readable medium comprising metadata.

BACKGROUND ART

Audiovisual multiuser communication is common nowadays. In such type of multiuser communication, user(s) are typically recorded by an audiovisual recording device, such as a webcam with integrated microphone, or by a separate visual recording device (e.g. camera) and audio recording device (e.g. microphone), with the captured visual data and audio data of the user then being played-out to other user(s).

A well-known example of such audiovisual multiuser communication is Skype, in which users may be recorded by a camera in their laptop, smartphone, tablet, etc., while the video data of other user(s) is played-out on the display of their device and the audio data is played-out using a speaker or a headphone.

Audiovisual multiuser communication may also take place in Virtual Reality (VR) or Augmented Reality (AR). Here, VR refers to the use of computer technology to simulate a users physical presence in a virtual environment, while AR refers to the use of computer technology to augment a user's view of the physical real-world environment by overlaying a virtual environment over, or in another manner combining the virtual environment with the user's view of the physical real-world environment.

In VR or AR-based multiuser communication, a visual representation of a user may be shown in a virtual environment, which in AR may be displayed as an overlay over the real physical environment of a user. An example of such a virtual environment is Improov (http://www.middlevr.com/improov/), which is said to be a 'platform for collaboration in virtual reality' and which is said to use a live camera recording of a user as an avatar in the virtual environment. The use of such a 'video avatar' in multiuser communication is also described in the paper *"Integrating live video for immersive environments"* by Hirose et al., IEEE Multimedia 6.3, 1999, pp. 14-22.

A problem of audiovisual multiuser communication in VR and AR, but also in general, is that current recording and rendering techniques of visual data and audio data do not provide a sufficiently realistic, or in the case of VR, immersive experience to users. More specifically, the inventors have seen that if a user changes face orientation, e.g., by rotating his/her head, this rotation is apparent to the other users from the played-out visual data, but the played-out audio may not, or not entirely, convey this change. For example, if the audio data is captured by a microphone which is attached to the user, the change in face orientation may have no effect on the characteristics of the recorded audio data but also not on the characteristics of the reproduction, e.g., in terms of play-out direction. If, on the other hand, the microphone has a static position with respect to the user, audio characteristics such as sound level or frequency distribution may change, but these changes do not fully convey the change in face orientation when the recorded audio data is played-out to other user(s).

SUMMARY OF THE INVENTION

It would be advantageous to be able to generate and/or render an audiovisual recording of a user which better conveys a change in face orientation.

The following measures basically involve determining a face orientation of the user in an audiovisual recording, and rendering the audio data as a spatial audio source having a spatial direction which is congruent with the face orientation.

In accordance with a first aspect of the invention, a method is provided of rendering an audiovisual recording of a user. The method may comprise:
  receiving visual data representing a visual recording of the user;
  receiving audio data representing an audio recording of the user;
  obtaining orientation data specifying an orientation, the orientation representing a face orientation of the user in the audiovisual recording;
  wherein the rendering the audiovisual recording comprises:
  rendering the visual data to establish a visual representation of the user on a display;
  based on the orientation data, rendering the audio data as a spatial audio source having a spatial direction which is congruent with the face orientation of the user in the visual representation.

A further aspect of the invention may provide a processor system for rendering an audiovisual recording of a user. The processor system may comprise:
  a communication interface configured to receive:
  visual data representing a visual recording of the user;
  audio data representing an audio recording of the user;
  orientation data specifying an orientation, the orientation representing a face orientation of the user in the audiovisual recording;
  a video processor configured to render the visual data to establish a visual representation of the user on a display; and
  an audio processor configured to, based on the orientation data, render the audio data as a spatial audio source having a spatial direction which is congruent with the face orientation of the user in the visual representation.

A further aspect of the invention may provide a method of generating an enhanced audiovisual recording of a user. The method may comprise:
  obtaining the audiovisual recording of the user by:
  capturing visual data representing a visual recording of the user;
  capturing audio data representing an audio recording of the user;
  determining a face orientation of the user in the audiovisual recording;

generating orientation data specifying an orientation which represents said determined face orientation.

A further aspect of the invention may provide a processor system for generating an enhanced audiovisual recording of a user. The processor system may comprise:
- a video interface to a video capture device configured for capturing visual data representing a visual recording of the user;
- an audio interface to an audio capture device configured for capturing audio data representing an audio recording of the user; and
- a processor configured to:
  - determine a face orientation of the user in the audiovisual recording;
  - generate orientation data specifying an orientation which represents said determined face orientation.

A further aspect of the invention may provide a transitory or non-transitory computer-readable medium comprising a computer program, the computer program comprising instructions for causing a processor system to perform either method.

A further aspect of the invention may provide a transitory or non-transitory computer-readable medium comprising orientation data for an audiovisual recording of a user, the orientation data specifying an orientation representing a face orientation of the user in the audiovisual recording.

The above measures are provided in response to insights gathered in audiovisual multiuser communication within the context VR, but also apply to AR and other types of audiovisual multiuser communication. In VR-based multiuser communication, the visual data of a user is typically rendered as an object in a virtual environment. For example, in case the visual recording is a 2D or stereoscopic 3D video recording, the object typically is a video plane which shows the recorded video data of the user in the virtual environment. Effectively, such a video plane may represent a 'virtual display' in the virtual environment on which the video data of a respective user is displayed.

FIGS. 1A and 1B illustrate a prior-art scenario in VR-based multiuser communication, which for the sake of illustration shows only two users but may include more users, in which a microphone is attached to the user to be captured while the video camera has a fixed position in the user's environment. When the user rotates in front of the video camera, the video plane in the virtual environment will normally not rotate, but rather simply show the recorded video data which now shows the user from his/her side. Accordingly, the video plane will convey the user's rotation by way of the changed contents of the video data. However, the audio characteristics during recording will substantially remain the same, e.g., in terms of sound level, while also the reproduction characteristics remain the same, e.g., in terms of sound direction. The rendered audio recording will thus mismatch the rendered video recording, which may degrade the multiuser communication. Without discussing FIGS. 2A and 2B in detail, it is noted that such problems also occur if a (mono) microphone is affixed to the camera: while the audio characteristics during recording may slightly change, e.g., the sound level being slightly reduced and the voice sounding more muffled, the sound direction during the play-out may still mismatch the user's face orientation in the visual recording.

To address such problems, the above measures may involve determining a face orientation of the user in the audiovisual recording, and generating orientation data specifying an orientation which represents said determined face orientation. These measures may be performed at the capture side where the audiovisual recording is made, at a play-out side where the audiovisual recording is played-out, or by another entity at another location, e.g., by a cloud-based processor system.

The orientation data may then be used to render the audio data as a spatial audio source having a spatial direction which is congruent with the face orientation of the user in the visual representation. This rendering may be performed at the play-out side where the audiovisual recording is played-out to a user, but may in some embodiments also be performed by another entity at another location, e.g., by a cloud-based processor system, in which case spatial audio data may be obtained as output in which the user's audio recording may be represented as a spatial audio source. Accordingly, also without considering actual play-out, the above measures may still allow for correctly establishing the spatial direction of the spatial audio source, e.g., when recording rather than playing-out the rendered video and audio.

The above measures may have the effect that the audio data is represented by a directional spatial audio source. Such spatial audio sources are known per se, e.g., from surround sound field reproduction techniques such as Ambisonics and object-based audio rendering techniques, and allow audio data to be rendered as a spatial sound source in a (spatial) sound field having a spatial position and spatial direction in the sound field. The sound field may then be reproduced by speakers in known ways, e.g., by placing virtual microphones in the sound field at relative positions corresponding to the actual relative positions between the speakers. This allows the viewing/hearing user to perceive the spatial direction of the audio recording of the captured user, e.g., his/her voice, to match the user's face direction in the visual representation of the user.

This may have as advantage that, in VR, a more immersive experience is provided to users. Generally, users may perceive the reproduction of the audiovisual recording to be more realistic, more involving, less tiresome, etc.

In the above and following, the term 'audiovisual recording of a user' may refer to a recording which is constituted at least by i) visual data representing a recording of at least the head/face of a user, and ii) audio data representing a recording of at least the voice of the user, e.g., of the user's speech, singing, etc.

The adjective 'visual' may refer to 'video', and thereby to video recording techniques based on 2D or stereoscopic 3D video cameras, but may also include recording and reproduction techniques based on point clouds, meshes, light fields, etc.

The term 'visual representation of the user' may refer to a result of the rendering of the visual data. For example, if the visual data is video data which is rendered on a video plane, the video plane showing the rendered video data may constitute the visual representation of the user. Another example is that if the visual data is a point cloud which is rendered in a 3D virtual environment, the resulting 3D rendered point cloud may constitute the visual representation of the user.

The term 'rendering' may in general be understood as the process of converting a digital description of something, e.g., visual data representing captured image sensor values or point cloud coordinates, into a user perceptible form, e.g., an output image that can be displayed on screen. If the rendering is specifically performed within the context of a virtual environment, such rendering may also include what is conventionally known as 'computer graphics rendering', e.g., the generating of the output image from a 2D or 3D model of the virtual environment. The 'rendering' may, but does not need to, include the step of actually playing-out the rendered result, e.g., the display of a generated output image, the play-out of an audio waveform, etc. An example without playout is the recording of such a rendering, e.g., as a clip or movie.

The adjective 'audio' may refer to a recording made using a microphone, e.g., a transducer that converts sound into an electrical signal. In some embodiments, the microphone may be a microphone configured for mono audio recording.

The spatial audio source having a spatial direction which is 'congruent with' the face orientation of the user in the visual representation may refer to there being a predetermined spatial relation between the determined face orientation and the spatial direction of the spatial audio source, and the spatial direction being established in accordance with this predetermined relation. Thereby, a rotation of the face orientation may result in a same or at least proportional rotation of the spatial direction of the spatial audio source. It is noted that in order for the spatial direction of the spatial audio source to actually match the face orientation of the user in the visual representation during reproduction, this may still require the video reproduction device, e.g., the display, to have a prescribed spatial relationship with the audio reproduction device, e.g., the speaker(s), and the spatial direction being established in accordance with this spatial relationship. Such matching during reproduction may be desired, but may be outside of the technical reach of the method(s) and processor system(s) since it may rely on the user to position his/her display and speakers correctly during reproduction. In general, the spatial direction may be established while presuming a certain spatial relationship between the video reproduction device and the audio reproduction device.

In an embodiment, the rendering the audiovisual recording may comprise:
  rendering the visual data in a virtual environment to establish the visual representation of the user within the virtual environment; and
  rendering the audio data as a spatial audio source in the virtual environment having a spatial position which is congruent with the spatial position of the visual representation of the user in the virtual environment.

The visual data may be rendered within the virtual environment, e.g., as a virtual object, while the audio data may be rendered as a spatial audio source in the virtual environment which may match the virtual object in terms of spatial position. This may provide a more realistic audiovisual representation of the user in the virtual environment, and may thereby provide a more immersive experience.

In this respect, it is noted that the spatial audio source being positioned 'in the virtual environment' may refer to the spatial audio source being positioned in a sound field of, e.g., representing the soundscape of, the virtual environment.

In an embodiment, the orientation data may be further indicative of a relative position of the user within a spatial outline of the visual representation, and the rendering the spatial audio source may comprise determining a spatial position of the spatial audio source with respect to the visual representation of the user which is congruent with said relative position of the user. The visual data may show also a part of the user's surroundings, e.g., a background. This may be caused by a video camera having a relative wide field of view. As a consequence, the user may assume different relative positions within the field of view of the camera, and thereby within the spatial outline of the visual recording. To obtain a more realistic audiovisual representation of the user, the spatial position of the spatial audio source may be determined in accordance with the relative position of the user within the spatial outline of the visual representation of the user, e.g., the video plane. For example, if the user leans left, the relative position of the spatial audio source may be moved to the left. In case the visual representation of the user is a three-dimensional representation, the relative position may also be defined in three dimensions, e.g., in X, Y and Z. It is noted that same or similar techniques may be used for the detection of the relative position of the user as are described further onwards for the detection of the face orientation.

In an embodiment, the generating of the enhanced audiovisual recording of the user may further comprise at least one of:
  associating the orientation data, or enabling the orientation data to be associated, with the audio data;
  generating synchronization data enabling the orientation data to be synchronized in time with the audio data; and
  generating an audiovisual stream comprising the visual data, the audio data, the orientation data and optionally the synchronization data.

The synchronization data may, for example, comprise timestamps or similar timing data. It is noted that when the orientation data is included as metadata in the headers of the audio data, such synchronization data may not be needed, as the orientation data may then apply to the audio data into which' header it is inserted.

In an embodiment, said generating may further comprise processing the audio data based on the determined face orientation, wherein said processing may comprise compensating for a change in audio characteristic resulting from a change in face orientation, such as a reduction in sound level or an attenuation of one or more frequency components. Changes in face orientation may result in a change in one or more audio characteristics of the audio recording, as the relative orientation between the user and the microphone may change, e.g., if the microphone has fixed position in the user's environment. For example, the user may turn away from the microphone, which may cause a reduction in sound level, the user's voice to appear more muffled, etc. Accordingly, audio processing may be applied to the audio recording so as to compensate for such changes. For example, the sound level of the audio recording may be increased, or an equalizer may be applied to the audio recording. This may have as advantage that the audibility of the audio recording may be improved. In another example, the microphone may be in a fixed position relative to the user's head, and the sound level of the user's voice may be constant even though in the rendering the captured user is turning away from the viewer. Accordingly, audio processing may be applied to introduce changes in the user's voice. For example, the sound level may be relatively lower when the captured user is turning away from the viewer, or a filtering may be applied to reduce the level of higher audio frequencies relatively more than lower audio frequencies. This step may be carried out, for example, right before playout, e.g., as part of a spatial audio framework used during rendering.

In an embodiment, said generating may further comprise encoding the audio data as spatial audio data in which the audio recording of the user is represented by a spatial audio source, wherein a spatial direction of the spatial audio source is congruent with the face orientation of the user in the visual representation. Rather than sending the orientation data to another entity which determines the spatial direction of the spatial audio source before or during play-out, such processing may already take place at the capture side, e.g., when generating the audiovisual recording. For example, the audio data may be encoded as spatial audio data in accordance with, e.g., the Ambisonics or an object-based audio format, in which the audio recording of the user is represented by a spatial audio source and in which the spatial direction of the spatial audio source may be appropriately selected. This may have as advantage that it may not be needed for the rendering system to be able to parse and process separate orientation data. Rather, it is only needed for the rendering system to parse and process the spatial audio data, which may be formatted in accordance with a standard and in which orientation data may be present in a standardized form. This may be particularly advantageous for two-person communication, as in more-than-two-person communication, each capture side may have to create the spatial audio data for each respective listener which may place a burden on the capture side and which may instead be performed centrally or at each rendering side based on the received audio data and the received orientation data of each respective user.

In an embodiment, determining a face orientation of the user in the audiovisual recording may comprise at least one of:
    analyzing the visual data using an image analysis or computer vision technique to determine the face orientation of the user from the visual recording; and
    tracking the face orientation of the user in an environment of the user, for example, using an orientation sensor in a head-mounted display worn by the user.

It will be appreciated that tracking the face orientation may be performed using other orientation sensors attached to the user's head, or may use image analysis algorithms to detect a user's face and face orientation in a captured video (possibly using other or additional cameras), or may use multiple microphones around the user to determine the face orientation based on the captured audio (possibly using other or additional microphones), etc. In general, one or a combination of known techniques for HMD tracking may be used, e.g., outside-in tracking, inside-out tracking, or a hybrid.

In a further aspect of the invention, any one of the processor systems described in this specification may be configured to indicate whether it supports orientation data. Here, the phrasing 'indicate support' may refer to data being generated and/or being transmitted to another entity which indicates a general type of support (e.g., whether the processor system is capable of generating, processing and/or using the orientation data) and/or a specific type of support (e.g., a specific type of use) and/or which specific type of orientation data is supported, etc.

This way, a processor system may indicate to another entity its capabilities with respect to the orientation data. For example, a capture device may indicate its support for generating the orientation data, and/or for adding the orientation data to a media stream, etc. Another example is that a rendering device may be configured to indicate its support for receiving, processing and/or using the orientation data for rendering. In addition to the aforementioned processor systems and specifically the capture device and rendering device being configured accordingly, also other entities may be configured to indicate their support for the orientation data, such as a network node located in a network path between the capture device and the rendering device which may add its capabilities to the end-to-end audio delivery chain. In general, a processor of a processor system may be configured for, via a communication interface, signaling its support with respect to the orientation data. Any of the described methods may further comprise signaling such support. A non-limiting example of such signaling of support may be such signaling during session setup of a communication session.

It will be appreciated by those skilled in the art that two or more of the above-mentioned embodiments, implementations, and/or aspects of the invention may be combined in any way deemed useful.

Modifications and variations of any one of both processor systems, methods and computer programs which correspond to the described modifications and variations of another one of both systems, methods and computer programs, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

FIGS. 2A and 2B are similar to FIGS. 1A and 1B but show the situation in case the microphone is positioned at a fixed position in relation to the camera;

FIGS. 3A and 3B are similar to FIGS. 2A and 2B but show the situation in case the microphone is an Ambisonics microphone;

FIGS. 4A and 4B are similar to FIGS. 3A and 3B but show the situation in case the visual representation of the user is viewed from a virtual viewpoint within the viewing environment which is not positioned along the optical axis of the camera;

FIG. 9 illustrates steps from capture to rendering which lead from the capture of user A to the rendering of a visual representation of user A in the viewing environment of FIG. 7 and the rendering of his/her audio as a spatial audio source;

FIG. 10 shows the orientation and position of user A in the capture environment having changed with respect to the situation of FIG. 8;

Figure 1A:
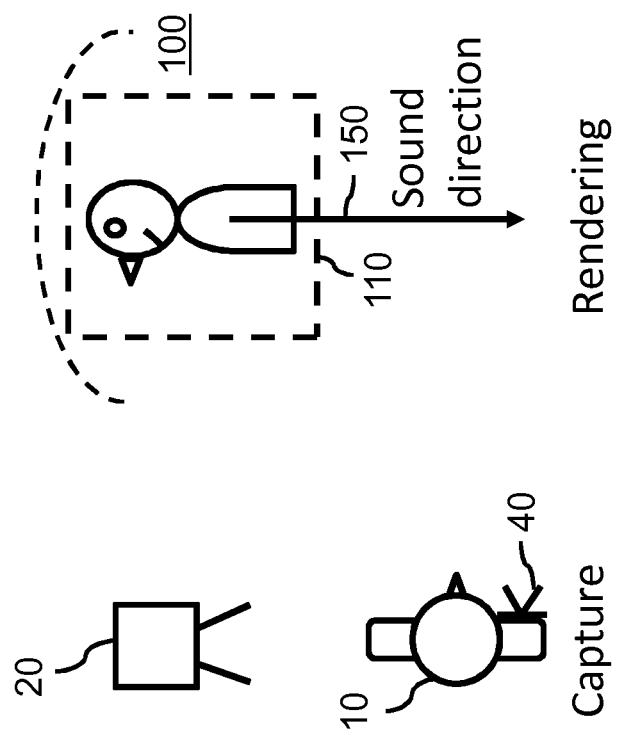
FIGS. 1A and 1B illustrate audiovisual multiuser communication within VR in which a microphone is affixed to the user and the user turns in front of a camera.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

10 user being recorded
20 video capture device (camera)
22 visual data
30 tracker
40 audio capture device (microphone)
42 audio data
50 Ambisonics microphone
60 display
62 display data
80 speaker
82 speaker signal
100, 102 virtual environment
110 visual representation (video object)
112 virtual viewpoint
114 visual representation and viewpoint of user A
116 visual representation and viewpoint of user B
120 table
122, 124 seat
150 sound direction
160 sound directions
200 capture
210 tracker
220 transformer
230 combiner
240 calibrator
250 interface
300 conversion
310 interface
320 converter
330 orchestrator
340 interface
400 rendering
410 interface
420 audio renderer
430 orchestrator
500 capture
502 capture audio
504 capture video
506 track user orientation, optional position
510 transmit audio, video, orientation, optional position
520 receive
530 render
600 processor system for generating enhanced audiovisual recording
610 video interface
620 audio interface
630 processor
640 communication interface
642 data representing enhanced audiovisual recording
700 processor system for rendering audiovisual recording
710 communication interface
720 video processor
730 audio processor
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

FIGS. 1A-4B describe known examples of audiovisual multiuser communication within the context of VR, while indicating problems related to such known examples. Subsequent figures and descriptions detail embodiments of the invention, which are also described within the context of VR but which equally apply to other types of audiovisual multiuser communication, e.g., AR or video conferencing without the use of a virtual environment, e.g., such as Skype, Facetime, etc.

FIG. 1A illustrates on the left-hand side a 'capture side' of audiovisual multiuser communication which shows the audiovisual recording of a user 10. In this and following figures, including the embodiments of the invention described from FIG. 5A onwards, the visual data is acquired by a video camera 20 which captures video data of the user 10 in his/her physical environment, e.g., in 2D or stereoscopic 3D. Alternatively, any other suitable visual recording technique and accompanying sensor or 'camera' may be used, e.g., based on point clouds, meshes, light fields, etc. In the figures, the camera is shown in a single location, but the camera may actually comprise multiple sensors or a camera system that may provide multiple recording angles of the user.

On the right-hand side, a 'rendering side' is shown in which a visual representation 110 of the user is shown in a virtual environment 100, the latter being shown only schematically. If the virtual environment 100 is rendered from a viewpoint of another user within the virtual environment 100 which faces the visual representation 110 of the user, as also shown in FIG. 1A, the other user would see user 10 head-on.

At the capture side, the audio of the user 10 may be recorded by a microphone 40 which may be affixed to the user. For example, the user 10 may wear a headphone which comprises the microphone 40, or the microphone may be clipped to a shirt of the user 10, etc. At the rendering side, the recorded audio may then be rendered in various ways. For example, the recorded audio may be simply played-out 'as-is' on a loudspeaker (not shown in FIG. 1A). When the other user is facing user 10 in the virtual environment, the direction of sound 150 would then match the direction the user 10 is facing within the virtual environment 100. Alternatively, the recorded audio may be played-out having a sound direction that has a fixed relation with the orientation of the visual representation 110 in the virtual environment. For example, if the visual representation 110 is a virtual display, the sound direction 150 may be selected at the rendering side to be perpendicular to the surface of the virtual display.

Figure 1B:
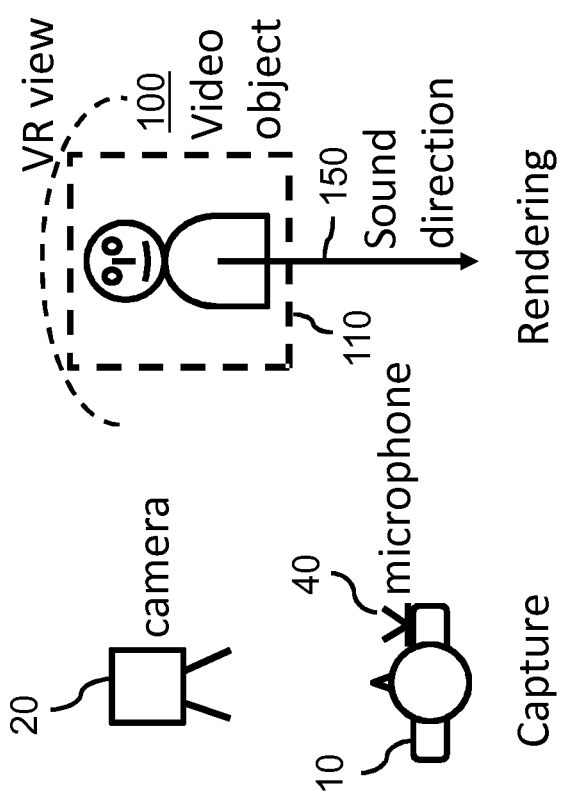

Both audio rendering techniques have a drawback, as is illustrated in FIG. 1B. Namely, when the user 10 turns in his/her physical environment, e.g., to the right, the visual representation 110 may show the user 10 from his/her side. However, the sound direction 150 of the rendered audio will remain the same. A viewer will thus experience a mismatch between the orientation of the face of the user as shown by the visual representation 110 of the user, and the sound direction 150 of the voice of the user. In fact, since the microphone 40 is affixed to the user 10, there are also no significant changes in other characteristics of the audio recording from which a viewer/listener may gather that the user 10 is turning or has turned.

FIGS. 2A and 2B are similar to FIGS. 1A and 1B but show the situation in case the microphone 40 is positioned at a fixed position in relation to the camera, e.g., near to or affixed to the camera 20. In this case, when the user 10 turns, the audio recorded by a regular (mono) microphone will change. For example, the sound level may be reduced, or the voice of the user 10 may appear more muffled. However, as is shown in FIG. 2B, the sound direction 150 of the rendered audio will still remain the same and thus mismatch the user's orientation in the visual representation 110.

FIGS. 3A and 3B are similar to FIGS. 2A and 2B but show the situation in case the microphone is an Ambisonics microphone 50, e.g., as described in [6]. Such a microphone may record the 3D soundscape or sound filed in the user's environment, which may be reproduced in 3D/surround sound at the rendering side, e.g., as indicated by sound directions 160 surrounding a viewer/listener. If the user 10 turns, as shown in FIG. 3B, the reproduction of the soundscape will correctly reflect the changed orientation of the user 10, e.g., the user's voice will appear to be directed to the right.

However, there are various disadvantages associated with the use of an Ambisonics microphone, besides the increased cost of such a microphone. For example, Ambisonics does not allow adapting the rendering of the audio to the virtual environment: the Ambisonics audio may be played-out, but it is currently not possible or at least quite difficult to adjust, e.g. by adding reflections and reverb if the virtual environment changes.

FIGS. 4A and 4B illustrate another disadvantage of the use of an Ambisonics microphone and the direct reproduction of the recorded sound field, while otherwise being similar to FIGS. 3A and 3B but showing the situation in case the visual representation of the user is viewed from a viewpoint 112 within the viewing environment 100 which is not positioned along the optical axis of the camera. Such a viewpoint 112 is also referred to as 'virtual' viewpoint as it may be defined within the virtual environment, e.g., corresponding to a virtual camera. For ease of explanation, the virtual viewpoint 112 is shown in FIGS. 4A and 4B in the user's actual environment but actually represents a viewpoint in the virtual environment 100 which faces the visual representation 110 of the user from the side. The right-hand side of FIG. 4A shows the virtual environment 100 from this viewpoint, showing the visual representation 110 from the side. In this respect, it is noted that for the content of the visual representation 110 to be perceptible and show a different perspective of the user 10 than originally recorded by the camera 20, e.g., from the side instead of from the front, the visual data and the visual representation thereof may need to be of a suitable type, e.g., recorded and reproduced as a point cloud or light field.

In FIG. 4A, the Ambisonics recording and reproduction of the sound field will cause the voice of the user 10 to appear to be directed towards the viewer, may which mismatch the orientation of the user in the visual representation 110, e.g., whom faces to the right. Likewise, if the user 10 turns towards the virtual viewpoint 112, as in FIG. 4B, the visual representation 110 may, when suitably recorded, processed and reproduced, show the user head-on, while the sound direction 160 of the user 10 may now appear to be directed towards the left.

Humans do use their hearing system to detect the orientation of other people speaking, see [1] and [2]. In audio-visual multiuser communication, it is thus of importance to spatially match audio to visuals, e.g., to obtain a sense of immersion.

The inventors devised to address this problem in various ways, which may generally involve determining the user's face orientation, thereby obtaining orientation data, and capturing the user's audio. The orientation data may then be used to suitably adjust the audio rendering, e.g., by transmitting the orientation data to a rendering side. The following first describes some general and specific options for the above steps, while then continuing to describe various embodiments with reference to FIGS. 5A-13.

Determining the user's face orientation may be performed in various ways, as also described elsewhere in this specification. For example, a head-mounted display (HMD) tracking system which is used for VR may be used to determine the user's head orientation, and thereby approximately the user's face orientation, and thereby approximately the direction of the user's voice, e.g., assuming that the main emission direction of sound waves is perpendicular to the user's face. In this respect, it is noted that head, face and voice direction or orientation may be used interchangeably within this specification. Such head orientation parameters are described, e.g., by https://developer.oculus.com/documentation/pcsdk/latest/concepts/dg-sensor/. It is noted that the user's head orientation may already be tracked by such a HMD tracking system, e.g., for the purpose of adjusting his/her viewpoint in the virtual environment. Data indicating the user's head/face orientation may thus already be available.

To capture the user's audio, a microphone near the user may be used, e.g., as integrated in a headphone of the user, or a separate microphone, e.g., nearby or integrated into the camera. The microphone may be a regular (mono) microphone or microphone array, but also a stereo or Ambisonics microphone. It may be preferred to only or primarily capture the audio of the user, and avoid capturing other sound sources. For that purpose, a microphone array (e.g. Microsoft Kinect, see http://www.contentmaster.com/kinect/kinect-sdk-beamforming/) and beamforming techniques may be used to derive the desired audio. When using a regular microphone, the orientation data may be used to process the captured audio, e.g., to compensate for changes in audio characteristics as a result of the user turning his/her head. For example, the sound level or frequency distribution may be equalized. Processing the captured audio may be of specific importance when the audio is played-out in or in relation to a VR environment, and the listening user is not in a similar position in relation to the representation of the captured user in the VR environment as the microphone is in the physical world in relation to the captured user.

The orientation data may specify the face/voice direction of the user in various ways. For example, the Web Audio API may be used which uses a (x,y,z) axis and which may describe an orientation of an audio source using 3 vectors (orientation.x, orientation.y and orientation.z), e.g., in accordance with https://developer.mozilla.org/en-US/docs/Web/API/PannerNode, while also describing the default 'shape' of the audio source, e.g., how 'wide' the source of the audio is, e.g., specified in parameters such as coneInnerAngle, coneOuterAngle and coneOuterGain.

The orientation data may be generated and/or provided once but also periodically, e.g., for each audio sample, at regular temporal intervals, at irregular temporal intervals, e.g., at each (significant) change in orientation, etc. Additionally, using the Web Audio API, the position and velocity of an audio source may be defined. The latter may be relevant when the user is moving while talking, singing, etc.

The audio rendering may be performed in various ways based on the orientation data. In general, this audio rendering may involve rendering the audio data as a spatial audio source having a spatial direction which is congruent with the face orientation of the user in the visual representation. For that purpose, techniques as described in [3] may be used. In a specific example, the visual data may be shown in the virtual environment, e.g., using A-Frame by which video data may be projected on a plane facing the viewer. An audio object may be created at substantially same position as the video plane using, e.g., the techniques described in [3], and be assigned a certain directivity, e.g., a sound direction. Using [3], this is currently only supported in Unity, not in A-Frame, although [3] is available for web/A-Frame also as Omnitone (https://googlechrome.github.io/omnitone/#home, used in Songbird, see https://github.com/resonance-audio/resonance-audio-web-sdk). The Web Audio API also allows defining an audio object with a directivity, which is referred to 'sound cones', see https://webaudi.github.io/web-audio-api/#Spatialization. The default front-facing direction of the audio may be aligned with the placement of the video plane, so that when the captured user looks directly into the camera and thus looks straight ahead in the video plane, the audio is also directed straight out of this plane.

Figure 5A:
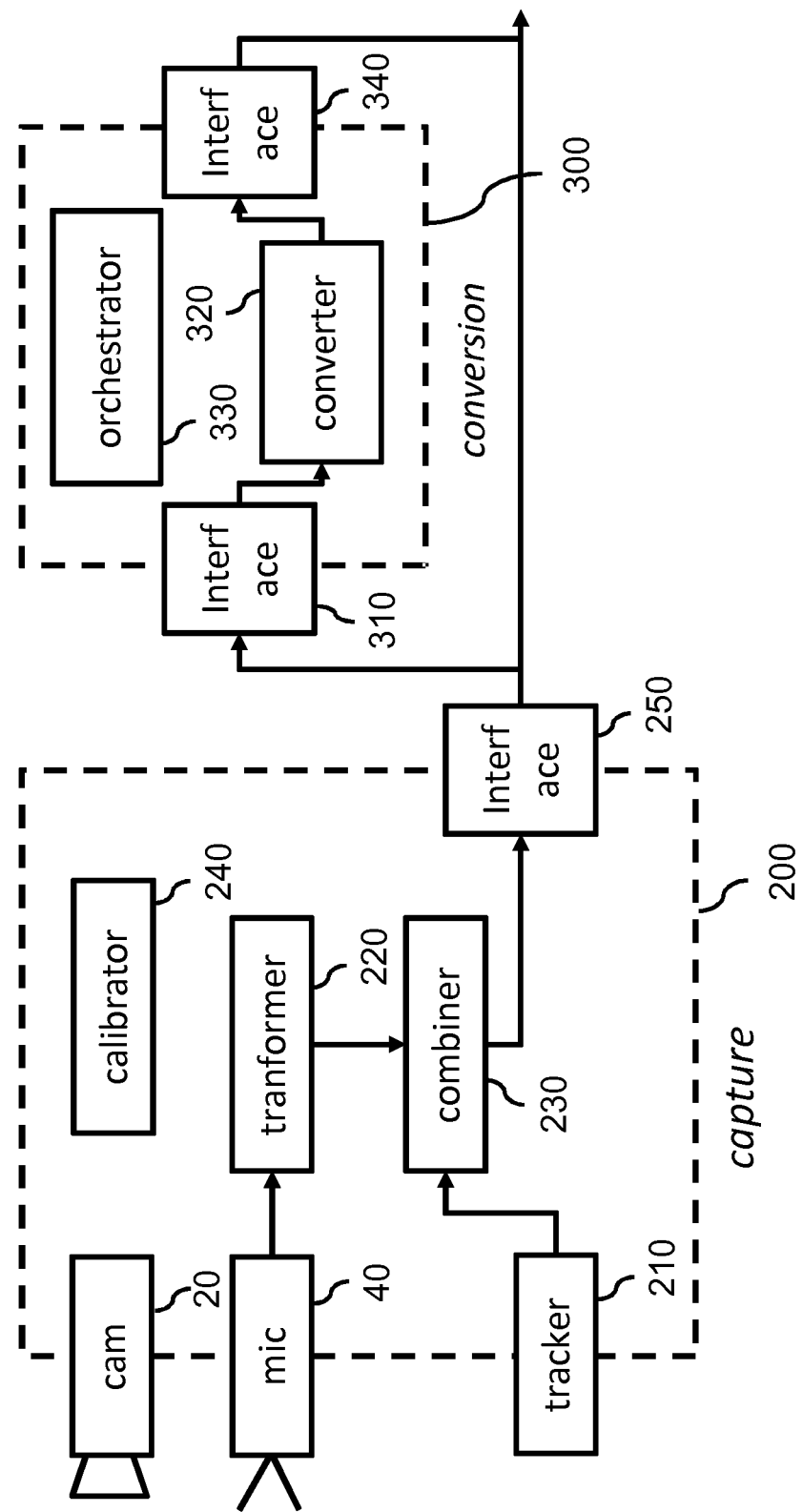
FIGS. 5A and 5B show a functional representation of capture, conversion and rendering in accordance with some embodiments of the inventions.
Figure 5B:
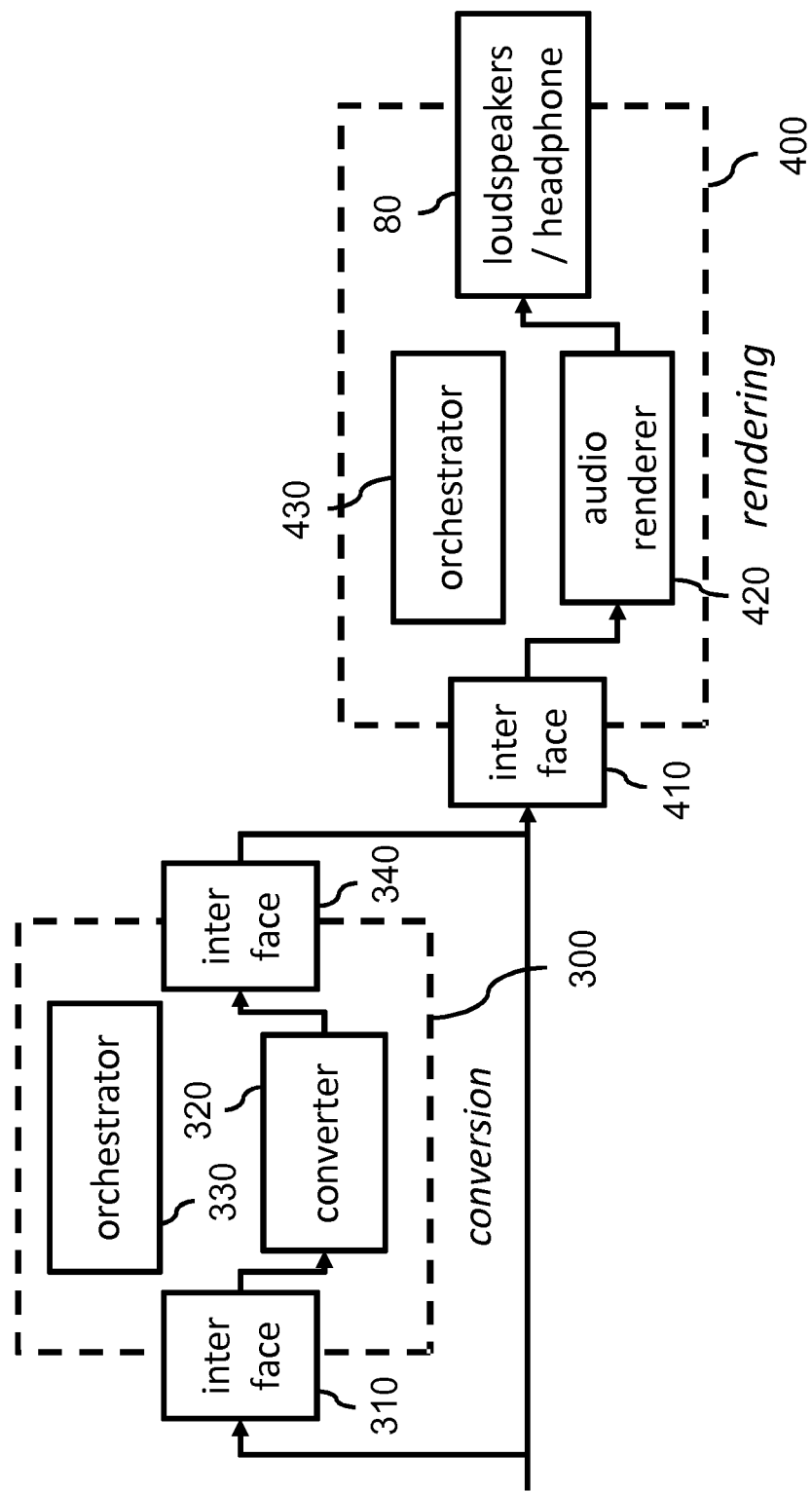

FIGS. 5A and 5B show a functional representation of capture, conversion and rendering in accordance with some embodiments of the inventions. FIG. 5A shows the capture 200, in which a microphone 40 may be used to record audio and a tracker 210 to track/detect the user's head/face orientation and optionally his/her position. The tracker 210 may be an HMD tracker, but also any other known type of tracking system which allows tracking the head/face orientation of a user. For example, it is known in the art to include algorithms for facial detection to include face (e.g., pose) orientation. Furthermore, a camera 20 may be used to capture video data of the user. The captured audio, captured video and the tracking data obtained from the tracker 210 may be synchronized in time, as is known per se from the field of media synchronization. To enable such synchronization, a calibrator 240 function may be used for calibrating the spatial relation between the tracker 210 and the camera 20, e.g., their relative position and orientation. A transformer 220 may be used to possibly transform the captured audio, e.g., by processing the audio data based on the tracking data (not explicitly shown in FIG. 5A). The tracking data, which may comprise orientation data but optionally also position data and other tracking data of the user, may be combined with the audio data by a combiner 230. For example, the audio data may be formatted as an audio stream or, together with the video data, as an audiovisual stream, and the orientation data may be included in said stream as metadata. The output may then be transmitted via an interface 250 to a receiver or receivers. It is noted that in the above and following, any reference to the term microphone is to be read as 'one or more' microphones, e.g., a microphone array, and any reference to the term camera is to be read as including 'one or more' cameras.

It is noted that the audio data may be converted before being delivered to a renderer. For example, the captured audio data of the user may, possibly together with other audio data, be transformed or converted into an Ambisonics signal. Such conversion 300 is shown in FIGS. 5A and 5B to be separate from the capture 200 and rendering 400, in that it may be performed by another entity and/or at another location, e.g., by cloud processing within 'the cloud', but may also be performed at the capture side or the rendering side, e.g., by a same system or apparatus performing the capture or the rendering, or by a system or apparatus connected thereto, etc.

The conversion 300 may functionally comprise an input interface 310, a converter 320 and an output interface 340. In addition, the conversion 300 may comprise an orchestrator 330, of which the function may be briefly explained as follows: to convert the audio data to, e.g., an Ambisonics signal, the virtual positions of the captured user and listening user may be used. Such information may also be called a 'scene description', and is also described further onwards. The orchestrator 300 may obtain such a scene description and may configure the converter 320 accordingly. This may involve configuring the converter differently for various listening users.

FIG. 5B shows the rendering 400, while also showing the conversion 300 previously shown in FIG. 5A so as to indicate the relation between FIGS. 5A and 5B. The rendering 400 may functionally comprise an input interface 410, an audio renderer 420 and an audio play-out device, e.g., loudspeaker(s) or a headphone 80. Also here, an orchestrator 430 is shown, of which the function may be explained as follows: if an Ambisonics signal is received, such a signal may be played-out directly, but some information may be needed. For example, if loudspeakers are used, information on the speaker setup may be needed, or if headphones are used, the orientation of the listener may be needed to correctly render the Ambisonics signal. For the latter purpose, a tracker may be used as described with reference to the capture 200, e.g., a HMD tracker. In case object-based audio is used, as will be described with reference to FIG. 6, a scene description may be needed, e.g., the position of the listener compared to the audio object, the direction the speaking/captured user is facing, again the orientation of the listener, etc.

Figure 6:
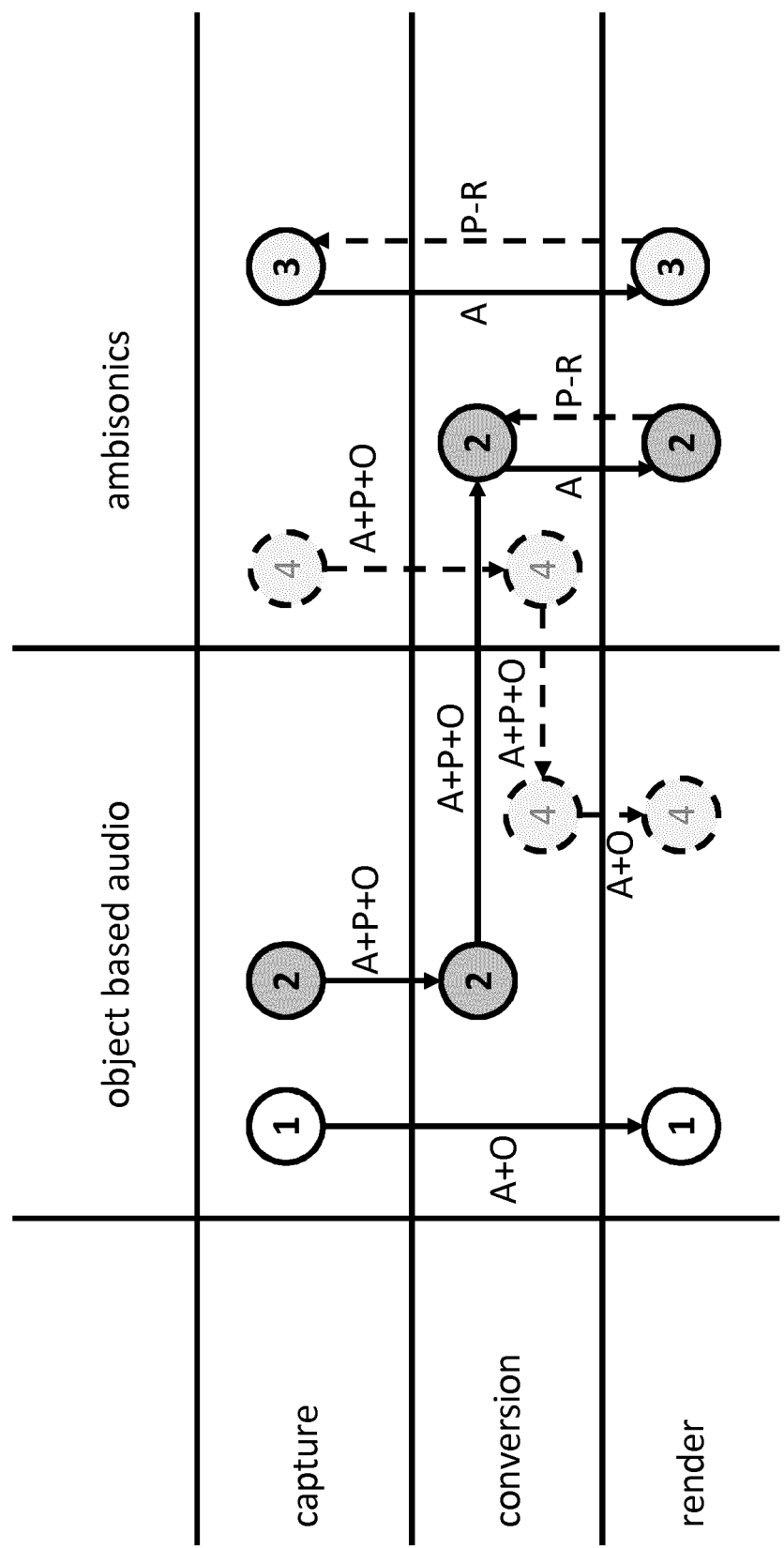
FIG. 6 shows various options for recording, processing and rendering of audio which involve the use of object-based audio and/or Ambisonics.

FIG. 6 shows various options for recording, processing and rendering of audio which involve the use of object-based audio and/or Ambisonics. The circles and arrows represent example cases within these options, where the label 'A' stands for 'Audio', 'O' stands for 'Orientation' and 'P' stands for Position, referring to the data which may need to be provided by the capture side in each of the respective cases. This position data may normally be part of the scene description for a virtual scene, e.g., it may be the position of the virtual objects (e.g., users) in the virtual environment.

1. Here, object-based audio is used for capture and rendering. Such object-based audio may refer to audio which is to be assigned to a specific object during rendering, and which may, but does not need to, be formatted in accordance with an object-based audio format. An example of such a format is given in [5]. However, object-based audio may be recorded as 'conventional' mono or stereo recordings, e.g., using a microphone attached to the user such as integrated in a headphone, of which the audio data is to be assigned to an object during rendering. An example of such an object is, within the context of the invention, the visual representation of the user. A specific example is a mono audio recording of the user, e.g., as a 16 bit 44.1 khz PCM waveform. The audio may thus be captured as mono audio which is then rendered as spatial audio source with a spatial direction. No other conversion may be needed. It may only be needed to determine the orientation (O) of the user, so as to determine the spatial direction in accordance with the orientation.

2. Here, the audio may be captured as object-based audio, which may be converted, e.g., in the cloud or elsewhere in-between capture and rendering, into an Ambisonics signal. To be able to do so, the converter may need the audio data (A), the orientation (O) and the position (P) of the captured user, and the scene description. Optionally, as shown by the dashed arrow upwards, the position (P-R) of the receiver (e.g., the viewer/listener, which is in the following also referred to as the 'receiving user') may also be dynamic, instead of assuming a static position in the scene. With this information, a suitable Ambisonics signal may be created for the receiving user.

3. Here, the audio data which may be captured by a non-Ambisonics microphone may be converted into an Ambisonics signal (A) at the capture side, e.g., using the aforementioned scene description and based on the orientation and the position of the captured user. As in case 2, optionally the position (P-R) of the receiving user may be supplied from the render side to the capture side to support dynamic positioning, e.g., moving listeners/viewers, which is indicated by the dashed arrow upwards. In case 3, the orientation data may thus be used directly by the capture side.

4. Here, the audio data (A) may be captured directly by an Ambisonics microphone. In addition, the orientation (O) and the position (P) of the captured user relative to the microphone may be determined. Using this information, the audio of the object of interest, e.g., the user, may be obtained by virtual beamforming [7] or similar techniques, thereby obtaining object-based audio, which may then be rendered in a same manner as in case 1, e.g., as a spatial audio source having a spatial direction which is determined in accordance with the orientation (O) of the captured user.

Note that the examples of FIG. 6 are not exhaustive, but merely show that various alternatives are possible with respect to the capture, conversion and rendering.

Figure 8:
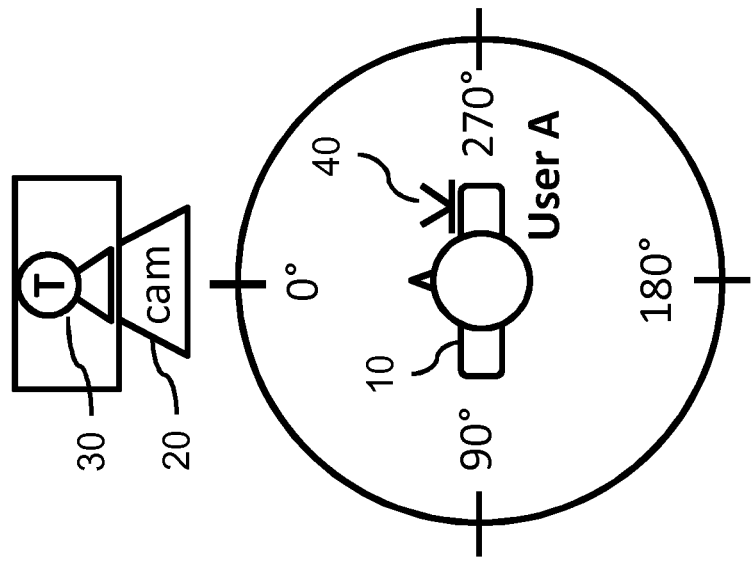
FIG. 8 shows the capture environment of user A.
Figure 7:
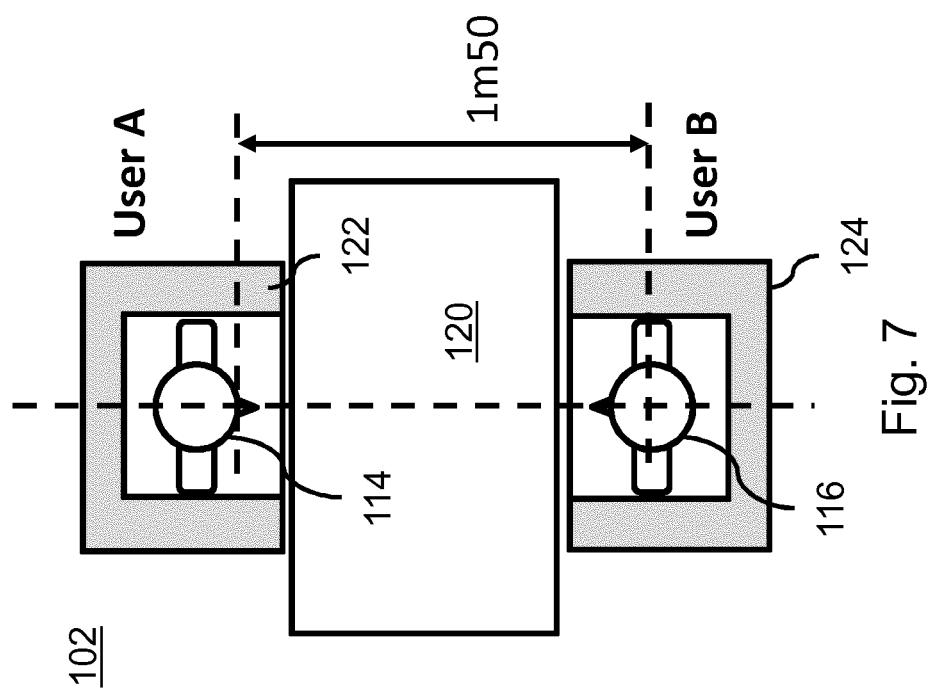
FIG. 7 shows a virtual environment in which users A and B are positioned with their visual representation and their viewpoint at respective sides of a table.

FIG. 7 shows a virtual environment 102 in which users A and B are positioned with their visual representations 114, 116 and their viewpoint at respective sides of a (virtual) table 120 while being seated in (virtual) seats 122, 124. Users A and B thus sit across from each other in the virtual environment 102. The distance between the mouth of user A (mouth=origin of the speech sounds) and the ears of user B (ears=destination of sound) may be 1 m50. In this example, the audio of user A may be captured to be rendered on headphones of user B. FIG. 8 shows the physical capture environment for user A, in which the user A 10 is recorded by a camera 20, on top of which a HMD tracker 30 may be placed. The user A 10 may wear a headphone with a microphone 40; the microphone may thus move with the user, e.g., during rotation.

The camera 20 may be calibrated with the tracker 30. This may be done by positioning the tracker 30 on the camera so as to provide the tracker 30 with a same or similar viewpoint as the camera 20. It may be needed to configure the tracker 30 or another entity processing the tracking data accordingly. Alternatively, computer vision may be used to detect the user's head orientation from an image captured by the camera 20. This may be done only to calibrate the spatial relationship between the camera 20 and the tracker 30, or may be done continuously to detect the user's head orientation. Alternatively, the user A 10 may be asked during a setup phase to look straight into the camera and then press an 'OK' button, or say 'OK' or use any other control interface to provide a confirmation. Various other ways of calibrating the camera 20 and tracker 30 may be used as well and are known per se in the relevant arts.

The three axes used in this example may be X (left-right), Y (down-up) and Z (front-back). The three rotations associated with these three axes using the right-hand system (thumb in direction of axis, fingers curved then showing the positive rotation direction) may be Pitch for X-axis, Yaw for Y-axis and Roll for Z-axis.

Initially, the tracker 30 may obtain tracking data which comprises position data and orientation data for user 10, e.g., comprising the following values:
Position=(X,Y,Z)=(0,0,0).
Orientation=(Pitch, Yaw, Roll)=(0,0,0)

A non-limiting example is that the position may be expressed in meters while the orientation may be expressed in degrees. For orientation, also various alternative representations exist, e.g., quaternion representation [8]. Also the position may be encoded differently, e.g., by using an Azimuth, elevation and distance.

FIG. 9 illustrates steps from capture to rendering which lead from the capture of user A to the rendering of the visual representation of user A in the viewing environment of FIG. 7 and the rendering of his/her audio as a spatial audio source. In particular, the capture 500 may comprise audio capture 502, video capture 504 and capturing 506 the orientation and optionally the position of the user, e.g., using the tracker 30 shown in FIG. 8. The orientation data and position data may be added as metadata to a stream comprising the audio data and/or video data, which may then be transmitted 510. It is noted that it may be needed to synchronize the respective data, e.g., using inter-stream synchronization techniques which are known per se from the technical field of media synchronization, since the direction of the play-out of the audio data may need to be aligned with the head rotations in the played-out video. The data may then be received 520 and rendered 530, e.g., by a play-out device or by another entity such as a cloud-based processor system, with the rendering comprising rendering the audio data as a spatial audio source having a spatial direction which is determined in accordance with the orientation of the user in the captured video.

FIG. 10 shows the orientation and position of user A 10 in the capture environment having changed with respect to the situation of FIG. 8. Here, the axis position values are shown in cm, whereas the rotation is shown as counter-clockwise degrees from 0 to 360. When the orientation and optionally the position of the captured user change, the orientation data and optionally the position data may be updated. This may be carried out in various ways. For example, if the orientation changes beyond a certain threshold, e.g., more than 10 degrees, a new orientation may be signaled. The orientation may also be continuously added as metadata to the audio stream. The sampling rate for the orientation data may be chosen to, e.g., match the video framerate, or at a lower rate, e.g., every second, fifth or tenth frame, or every 100 ms, every second, etc. Various other regular or irregular update rates are equally possible.

In the example of FIG. 10, the user A 10 may lean backward and to the left compared to the situation of FIG. 8, e.g., to allow looking over his/her right shoulder as one would do to look behind oneself. The tracking data may now indicate:
Position=(X,Y,Z)=(−0.2,0,0.2).
Orientation=(Pitch, Yaw, Roll)=(0,270,0)

With further reference to the orientation data, this may be encoded as metadata, e.g., to the audio data. In a specific example, the orientation data may be encoded using MPEG-H metadata model, see section 4.2 from [4]. A dynamic element may be added called 'Orientation' which may be in degrees with the same reference orientation as the Azimuth description. Here, 'Azimuth' may refer to the direction in degrees of the audio object in relation to a reference point, e.g., a listener's position.

MPEG-H 3D Audio [9] defines a syntax for encoding the Azimuth using either 7 or 9 bits, depending on the indicated precision. This may be re-used for a new orientation metadata field, which may have a static parameter called angularPrecision, where an angular precision bit indicates if each bit represents 5 degrees (angularPrecision=0) or 1 degree (angularPrecision=1), and an OrientationDirection parameter indicating clockwise (value of 1) or counter clockwise (value of 0).

So, a 270-degree Yaw may be encoded as either:
angularPrecision=0, OrientationDirection=1, OrientationAngleIdx=18, or
angularPrecision=1, OrientationDirection=1, OrientationAngleIdx=90

This new parameter may be added to the binary encoded object metadata in the MPEG-H bitstream, similar to the other parameters and as known in the art.

In ETSI object-based audio [5], azimuth/radius/elevation may used to encode position as in MPEG-H, but may be encoded differently. ETSI defines positions as a struct. The orientation may be defined in a similar way, either as a separate struct:

```
struct Orientation {
    OptionalItem<unsigned int(12)>    fOrientation;
}
``` or as an addition to the position struct:

```
struct Position {
    OptionalItem<unsigned int(12)>    fRadius;
    OptionalItem<unsigned int(12)>    fAzimuth;
    OptionalItem<unsigned int(11)>    fElevation;
    OptionalItem<unsigned int(12)>    fOrientation;
}
```

The interpretation of these value may be the same for fOrientation as for fAzimuth, and may be defined as orientation=(fOrientation−2048)*(360/2048), thus covering −360 to 360 degrees, or when using radians as orientation= (fAzimuth−2048)*(2π/2048). The aforementioned 270-degree Yaw may thus be encoded as a clockwise 90-degree Yaw, resulting in a parameter value of 2560. This metadata element may be added to the ETSI metadata specification as known in the art. Note that also the up/down head rotation (as one makes when nodding 'yes') may be added for the orientation. For example, if a user tilts his/her head backwards or bends his/her head down, such change in orientation may be added to the metadata in a similar way, e.g., by adding an attribute fOrientationUpwards in a similar manner.

Another way of encoding the orientation is with a vector, e.g., in accordance with the Web Audio API (footnote 10) using values on the three axis X, Y, Z, e.g.:
orientationX=1
orientationY=0
orientationZ=0

In general, WebRTC technology may be used to stream the audio and video as media streams. The WebRTC data channel may be used to separately supply orientation data and updates thereof. Optionally, timestamps may be included to ensure synchronization between the metadata and the audio and video streams.

Besides orientation and position, the velocity of the captured user may be considered, as movement of a sound source also may influence the sound characteristics which may be reproduced at the rendering side. It is noted that the velocity may not need to be separately measured, but may be calculated from position data indicating two or more positions and their time of measurement.

If the HMD consists of a mobile phone in an enclosure, e.g., as with the Samsung Gear VR, the compass (e.g. a MEMS Magnetometer) may be used as a tracker to detect the orientation of the HMD and thereby of the user's face.

Measuring the HMD position and orientation is an indication of the user's head/face position and orientation. However, the measured position typically does not correspond to the exact mouth position, which may be relevant as the mouth may be considered the point of origin point of the sound a user makes when speaking. This mismatch may be corrected, e.g., by applying an offset to the position data which is derived from a default head model, e.g., based on an average-sized human head, or by using computer vision to detect the actual mouth position relative to the HMD position.

In general, entities involved in multiuser communication using orientation data may need to support orientation data, with the type of support depending on the role of the entity. For example, the capture side may need to be able to supply the orientation data, and the rendering side may need to be able to process and use ('apply') the orientation data. To this end, entities may indicate their support during session setup. Session setup is typically done using a session protocol such as SIP, which uses SDP to indicate all media parameters supported and agreed upon. For example, the indication of support may be added to the SDP parameters in the audio part, e.g., by adding an attribute: a=orientationCapable, or adding this information as a parameter to the audio profile for the various object-based audio codecs. In this way, the entities in the session may know the capabilities of the other entities and this may ensure a working end-to-end chain. Of course, if the network adds these capabilities, e.g. by using image analysis to add orientation information, or by audio conversion to supply proper audio directions, the network may be part of this session negotiation process, e.g. by acting as a proxy during session setup and adding the capabilities.

Figure 11:
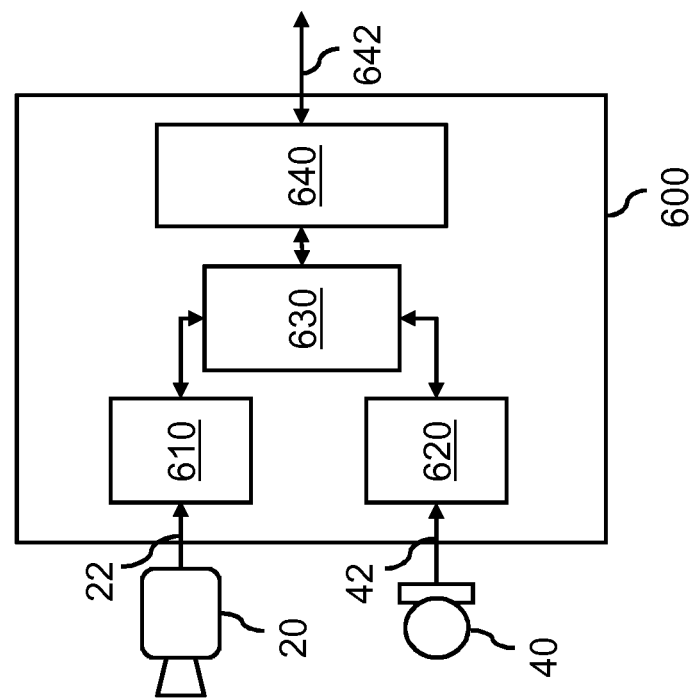
FIG. 11 shows a processor system configured for generating an enhanced audiovisual recording of a user to be used in audiovisual multiuser communication.

FIG. 11 shows a more detailed view of a processor system 600 which may be configured for generating an enhanced audiovisual recording of a user. The processor system 600 of FIG. 11 may implement part or all of the 'capture side' functionality as described with reference to FIGS. 4-10 and elsewhere.

The processor system 600 is shown to comprise a video interface 610 to a video capture device 20 which may be configured for capturing visual data 22 representing a visual recording of the user. Here, the adjective 'video' is to be understood as also including video represented by point clouds, meshes, light fields, etc. The video capture device 20 may be a visible light camera or a range camera, or any other type of video capture device, including but not limited to those mentioned in this specification. The video capture device 20 may also comprise multiple cameras. In some embodiments, the video capture device 20 may be part of the processor system 600. The video interface 610 may be, e.g., a communication interface to an internal or external bus such as a Universal Serial Bus (USB) via which the video data 22 may be received. Alternatively, the video interface 610 may be a network interface, including but not limited to a wireless network interface, e.g., based on Wi-Fi, Bluetooth, ZigBee, 4G mobile communication or 5G mobile communication, or a wired network interface, e.g., based on Ethernet or optical fiber. In this case, the processor system 600 may access the video data 22 via the network, e.g., from a media source. For example, the network interface may be a local area network (LAN) network interface, but may also be a network interface to a wide area network (WAN), e.g., the Internet.

The processor system 600 is further shown to comprise an audio interface 620 to an audio capture device 40 which may be configured for capturing audio data 52 representing an audio recording of the user. The audio capture device 40 may be a microphone or microphone array or any other type of audio capture device, including but not limited to those mentioned in this specification. In some embodiments, the audio capture device 40 may be part of the processor system 600. The audio interface 620 may be of any suitable type, including those mentioned for the video interface 610.

The processor system 600 is further shown to comprise a processor 630 which may be configured, e.g., by hardware design or software, to perform operations described with reference to FIG. 4-10 and elsewhere pertaining to the capture side, including but not limited to the determining of the face orientation and the generating of the orientation data. For example, the processor 630 may be embodied by a single Central Processing Unit (CPU), but also by a combination or system of such CPUs and/or other types of processing units. Although not shown in FIG. 11, the processor system 600 may also comprise a data storage, such as internal memory, a hard disk, a solid-state drive, or an array thereof, which may be used to buffer data, e.g., the video data 22, the audio data 42 and/or the orientation data. FIG. 11 further shows the processor system 600 to comprise a communication interface 640, which may be any suitable type of interface for outputting the video data 22, the audio data 42 and/or the orientation data, including but not limited to a storage interface or a network interface. The output may be, e.g., an orientation data-enhanced audiovisual stream 642.

The processor system 600 may be embodied by a (single) device or apparatus. For example, the processor system 600 may be embodied as smartphone, personal computer, laptop, tablet device, gaming console, set-top box, television, monitor, projector, smart watch, smart glasses, media player, media recorder, etc. The processor system 600 may also be embodied by a distributed system of such devices or apparatuses. An example of the latter may be the functionality of the processor system 600 being at least in part distributed over network elements in a network.

Figure 12:
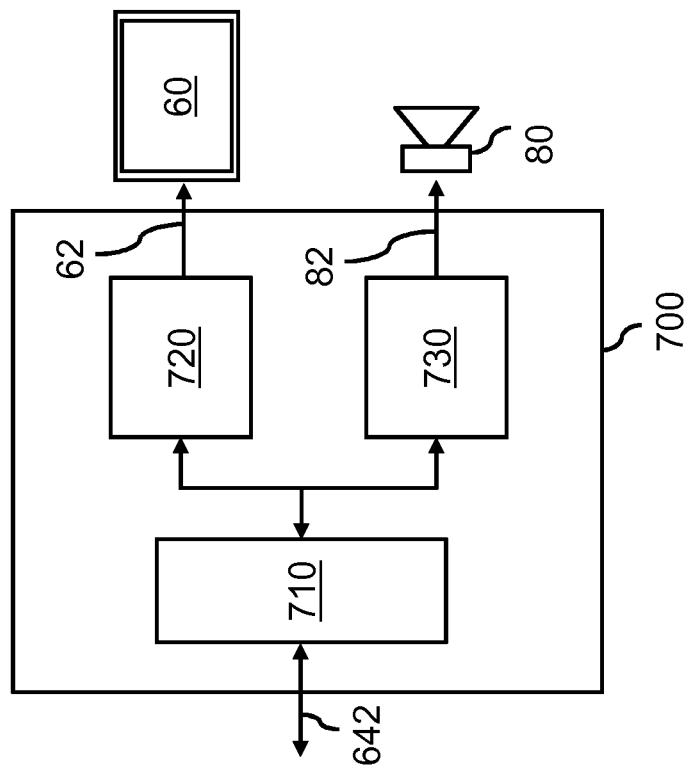
FIG. 12 shows a processor system configured for rendering an audiovisual recording of a user, and in particular an enhanced audiovisual recording.

FIG. 12 shows a more detailed view of a processor system 700 which may be configured for generating an enhanced audiovisual recording of a user. The processor system 700 of FIG. 12 may implement part or all of the 'render side' functionality as described with reference to FIGS. 4-10 and elsewhere.

The processor system 700 is shown to comprise a communication interface 710 which may be configured to receive data 642 representing an enhanced audiovisual recording, e.g., visual data representing a visual recording of the user, audio data representing an audio recording of the user, and orientation data specifying an orientation representing a face orientation of the user in the audiovisual recording. The communication interface 710 may be any suitable type of interface for receiving said data, including but not limited to a storage interface or network interface.

The processor system 700 is further shown to comprise a video processor 720 which may be configured, e.g., by hardware design or software, to perform operations described with reference to FIG. 4-10 and elsewhere pertaining to the rendering of the video data. In some embodiments, the video processor 720 may directly generate and output display data 62 to a display 60 such as an HMD. In other embodiments, the video processor 720 may output rendered video data which may be output to a display by another part of the processor system 700 or another entity.

The processor system 700 is further shown to comprise an audio processor 730 which may be configured, e.g., by hardware design or software, to perform operations described with reference to FIG. 4-10 and elsewhere pertaining to the rendering of the audio data. In some embodiments, the audio processor 730 may directly output a speaker signal 82 to a speaker 80, e.g., a loudspeaker or headphone. In other embodiments, the audio processor 730 may merely output rendered audio data which may be output to the speaker 80 by another component or entity.

The video processor 720 and the audio processor 730 may each or together be embodied by a single Central Processing Unit (CPU), but also by a combination or system of such CPUs and/or other types of processing units.

Although not shown in FIG. 12, the processor system 700 may also comprise a data storage, such as internal memory, a hard disk, a solid-state drive, or an array thereof, which may be used to buffer data, e.g., the received video data 22, the received audio data 42 and/or the received orientation data.

The processor system 700 may be embodied by a (single) device or apparatus. For example, the processor system 700 may be embodied as smartphone, personal computer, laptop, tablet device, gaming console, set-top box, television, monitor, projector, smart watch, smart glasses, media player, media recorder, etc. The processor system 700 may also be embodied by a distributed system of such devices or apparatuses. An example of the latter may be the functionality of the processor system 700 being distributed at least in part over network elements in a network.

In general, the processor system 600 of FIG. 11 and the processor system 700 of FIG. 12 may each be embodied as, or in, a device or apparatus. The device or apparatus may comprise one or more (micro)processors which execute appropriate software. The processors of either system may be embodied by one or more of these (micro)processors. Software implementing the functionality of either system may have been downloaded and/or stored in a corresponding memory or memories, e.g., in volatile memory such as RAM or in non-volatile memory such as Flash. Alternatively, the processors of either system may be implemented in the device or apparatus in the form of programmable logic, e.g., as a Field-Programmable Gate Array (FPGA). Any input and/or output interfaces may be implemented by respective interfaces of the device or apparatus, such as a network interface. In general, each unit of either system may be implemented in the form of a circuit. It is noted that either system may also be implemented in a distributed manner, e.g., involving different devices.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium, e.g., in the form of a series of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc.

Figure 13:
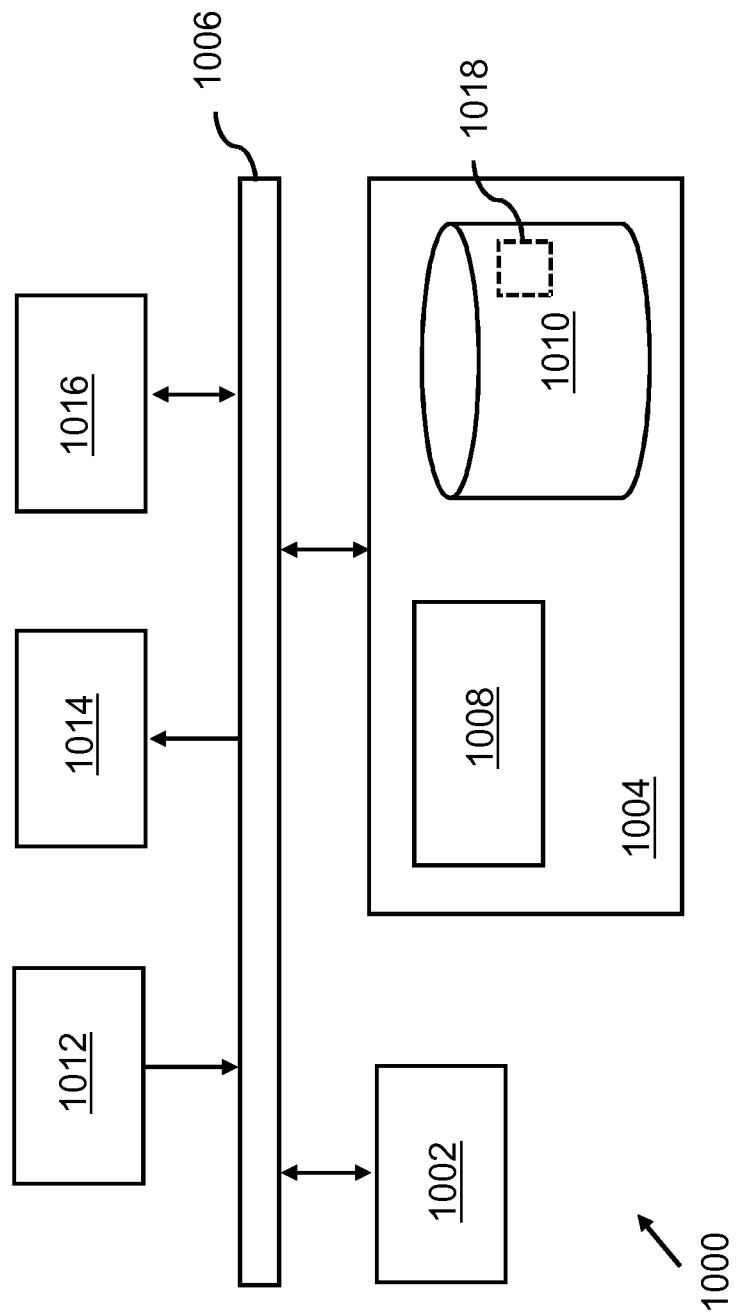
FIG. 13 shows an exemplary data processing system.

FIG. 13 is a block diagram illustrating an exemplary data processing system that may be used in the embodiments described in this specification. Such data processing systems include data processing entities described in this specification, including but not limited to the processor systems, capture systems or apparatuses, conversion systems or apparatuses, rendering systems or apparatuses, etc.

The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 13, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may represent one of the entities indicated by numerals 200, 300, 400, 600 or 700, e.g., a capture system or apparatus, a conversion system or apparatus, a rendering system or apparatus, or a respective processor system. In that case, application 1018 may represent an application that, when executed, configures data processing system 1000 to perform the functions described herein with reference to said entity.

REFERENCES

[1] Kato, Hiroaki, et al. *"On the human ability to auditorily perceive human speaker's facing angle."* Universal Communication Symposium (IUCS), 2010 4th International. IEEE, 2010.
[2] Edlund, Jens, Mattias Heldner, and Joakim Gustafson. *"On the effect of the acoustic environment on the accuracy of perception of speaker orientation from auditory cues alone."* 13th Annual Conference of the International Speech Communication Association 2012, INTERSPEECH 2012. Curran Associates, Inc., 2012.
[3] https://developers.google.com/vr/concepts/spatial-audio
[4] Fueg, Simone, et al. *"Design, coding and processing of metadata for object-based interactive audio."* Audio Engineering Society Convention 137. Audio Engineering Society, 2014.
[5] ETSI TS 103 223 V1.1.1 (2015-04), MDA; Object-Based Audio Immersive Sound Metadata and Bitstream.
[6] Rafaely, Boaz, et al. *"Spherical microphone array beamforming."* Speech Processing in Modern Communication. Springer Berlin Heidelberg, 2010. 281-305.
[7] Ortolani, F., & Uncini, A. (2016, April). A new approach to acoustic beamforming from virtual microphones based on Ambisonics for adaptive noise cancelling. In Electronics and Nanotechnology (ELNANO), 2016 IEEE 36th International Conference on (pp. 337-342). IEEE.
[8] Bajd, T., Mihelj, M., & Munih, M. (2013). Introduction to robotics. Springer Science & Business Media.
[9] ISO/IEC 23008-3:2015/Amd 3:2017, MPEG-H 3D Audio Phase 2

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of rendering an audiovisual recording of a user, the method comprising:
   receiving visual data representing a visual recording of the user;
   receiving audio data representing an audio recording of the user;
   obtaining orientation data specifying an orientation, the orientation representing a face orientation of the user in the audiovisual recording;
   wherein the rendering the audiovisual recording comprises:
   rendering the visual data to establish a visual representation of the user on a display;
   based on the orientation data, rendering the audio data as a spatial audio source having a spatial direction which is congruent with the face orientation of the user in the visual representation.

2. The method according to claim 1, wherein the rendering the audiovisual recording comprises:
rendering the visual data in a virtual environment to establish the visual representation of the user within the virtual environment; and
rendering the audio data as a spatial audio source in the virtual environment having a spatial position which is congruent with the spatial position of the visual representation of the user in the virtual environment.

3. The method according claim 1, wherein:
the orientation data is further indicative of a relative position of the user within a spatial outline of the visual representation; and
the rendering the spatial audio source comprises determining a spatial position of the spatial audio source with respect to the visual representation of the user which is congruent with said relative position of the user.

4. The method according to claim 1, wherein the rendering the audio as the spatial audio source comprises using:
a surround sound field reproduction technique such as Ambisonics; or
an object-based audio rendering technique.

5. A non-transitory computer-readable medium comprising a computer program, the computer program comprising instructions for causing a processor system to perform the method according to claim 1.

6. A method of generating an enhanced audiovisual recording of a user, the method comprising:
obtaining the audiovisual recording of the user by:
capturing visual data representing a visual recording of the user;
capturing audio data representing an audio recording of the user;
determining a face orientation of the user in the audiovisual recording;
generating orientation data specifying an orientation which represents said determined face orientation;
encoding the audio data as spatial audio data in which the audio recording of the user is represented by a spatial audio source,
wherein a spatial direction of the spatial audio source is congruent with the face orientation of the user in the visual representation.

7. The method according to claim 6, further comprising at least one of:
associating the orientation data, or enabling the orientation data to be associated, with the audio data;
generating synchronization data enabling the orientation data to be synchronized in time with the audio data; and
generating an audiovisual stream comprising the visual data, the audio data, the orientation data and optionally the synchronization data.

8. The method according to claim 6, further comprising: processing the audio data based on the determined face orientation, wherein said processing comprises compensating for a change in audio characteristic resulting from a change in face orientation, such as a reduction in sound level or an attenuation of one or more frequency components.

9. The method according to claim 6, wherein determining a face orientation of the user in the audiovisual recording comprises at least one of:
analyzing the visual data using an image analysis or computer vision technique to determine the face orientation of the user from the visual recording; and
tracking the face orientation of the user in an environment of the user, for example, using an orientation sensor in a head-mounted display worn by the user.

10. A processor system for rendering an audiovisual recording of a user, the processor system comprising:
a communication interface configured to receive:
visual data representing a visual recording of the user;
audio data representing an audio recording of the user;
orientation data specifying an orientation, the orientation representing a face orientation of the user in the audiovisual recording;
a video processor configured to render the visual data to establish a visual representation of the user on a display; and
an audio processor configured to, based on the orientation data, render the audio data as a spatial audio source having a spatial direction which is congruent with the face orientation of the user in the visual representation.

11. A processor system for generating an enhanced audiovisual recording of a user, the processor system comprising:
a video interface to a video capture device configured for capturing visual data representing a visual recording of the user;
an audio interface to an audio capture device configured for capturing audio data representing an audio recording of the user; and
a processor configured to:
determine a face orientation of the user in the audiovisual recording;
generate orientation data specifying an orientation which represents said determined face orientation; and
encode the audio data as spatial audio data in which the audio recording of the user is represented by a spatial audio source,
wherein a spatial direction of the spatial audio source is congruent with the face orientation of the user in the visual representation.

12. A non-transitory computer-readable medium comprising orientation data and synchronization data for an audiovisual recording of a user, wherein the audiovisual recording comprises an audio recording and a visual recording of the user, the orientation data specifying an orientation representing a face orientation of the user in the audiovisual recording, wherein the orientation data is further indicative of a relative position of the user within a spatial outline of the visual recording, and the synchronization data enables the orientation data to be synchronized in time with the audiovisual recording.

\* \* \* \* \*